Oct. 27, 1959     E. BAAS     2,910,190
BOOM ARM

Original Filed Sept. 7, 1955     3 Sheets-Sheet 1

INVENTOR
ERWIN BAAS.
BY
ATTORNEY.

Oct. 27, 1959     E. BAAS     2,910,190
BOOM ARM

Original Filed Sept. 7, 1955     3 Sheets-Sheet 2

INVENTOR
ERWIN BAAS.
BY
ATTORNEY.

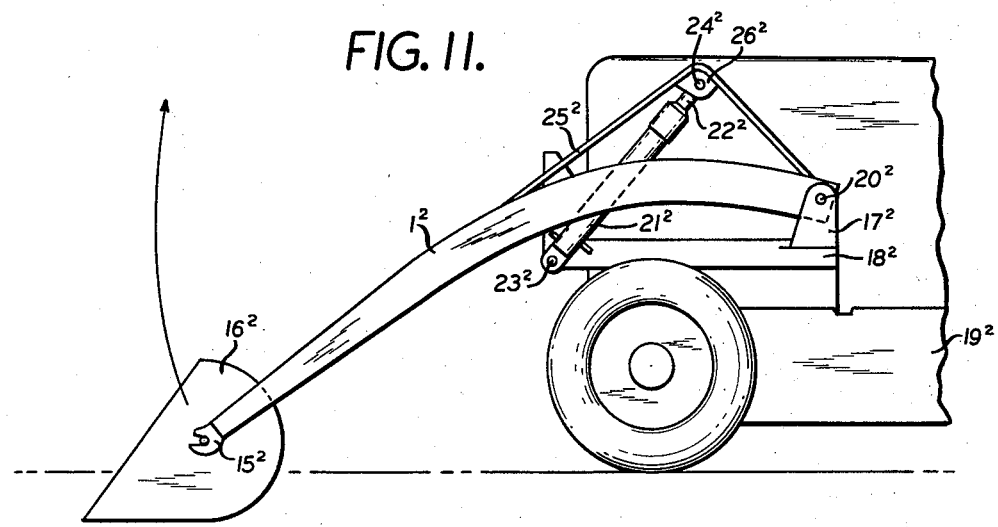
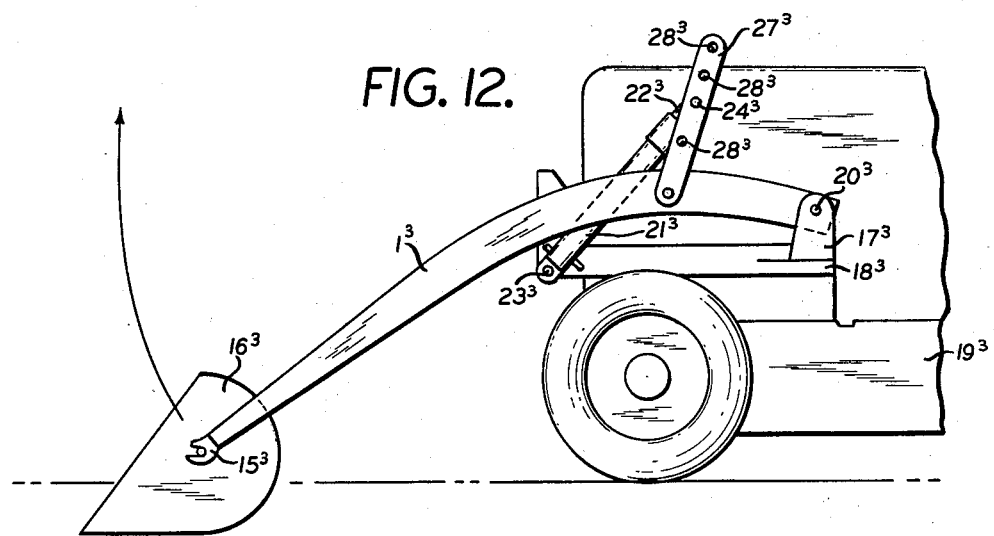

United States Patent Office 2,910,190
Patented Oct. 27, 1959

2,910,190

BOOM ARM

Erwin Baas, Hamburg-Hochkamp, Germany

Original application September 7, 1955, Serial No. 532,993. Divided and this application October 30, 1956, Serial No. 619,154

Claims priority, application Germany May 12, 1955

3 Claims. (Cl. 212—144)

The present invention relates to a boom arm in general and to such boom arm to be mounted at the front or rear end of a vehicle, as a tractor, in particular.

This is a divisional application of the copending patent application Serial No. 532,993, filed September 7, 1955.

It has been proposed before to provide loaders mounted on vehicles which comprise usually riveted or welded box carriers which are designed in such manner that the cross section bearing the greatest strain has the greatest resistance and which cross section is then tapered off along the carrier in accordance with the stresses subjected thereto. The ends of such box carriers are equipped with reinforcements in the form of attachments, boxes, which are welded thereto, or the like, in order to provide for the attachment of crane hooks or for the incorporation of axles or the like. These known loaders require a comparatively long time for manufacture and cannot be made in an economical manner.

It is, therefore, one object of the present invention to provide a boom arm which avoids the drawbacks of the known structures.

It is another object of the present invention to provide a loader, the boom arm of which is formed of one or a plurality of beams which are pressed flat in their center portion crosswise to the direction of the stresses and which are at their ends folded to the inside towards the center thereof. The two booms which are formed of hollow beams are connected together by particularly provided cross members. Since the starting material for the loader is a cylindrically or conically shaped tube into which the flat pressing and folding is worked, a fast and economical manufacture is presented and the inwardly directed fold at the ends of the tube brings about automatically a reinforcement, thereby eliminating additional attachment normally required to achieve this end and simultaneously providing a still more economical manufacture.

It is still another object of the present invention to provide a loader comprising a hollow beam which is provided with brackets, supports, braces or the like for connection with pneumatic or hydraulic cylinders, thereby providing means for up and down motion or for a rotating motion of the lift arm.

It is yet another object of the present invention to provide a loader which comprises a beam the ends of which are folded to the inside towards the center thereof which are adapted to receive bearing supports for the lift arm on one hand and on the other hand a reinforced and stiff end for fitting a crane hook, a grab support or a hook for implements or the like.

With these and other objects in view which will become apparent in the following detailed description, the present invention will be clearly understood in connection with the accompanying drawing, in which.

Figure 1:
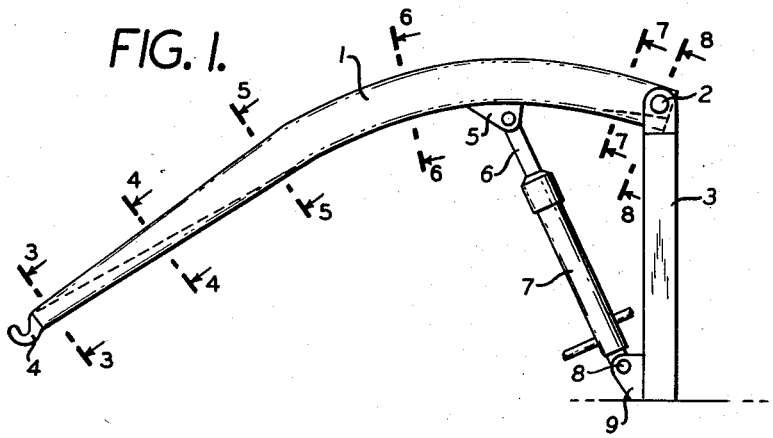
Figure 1 is a side elevational view of a hoist provided with a beam designed in accordance with the present invention.
Figure 3:
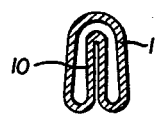
Figure 4:
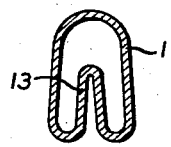
Figure 5:
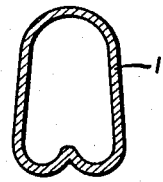
Figure 6:
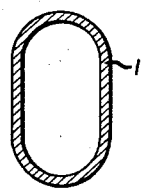
Figure 7:
Figure 8:
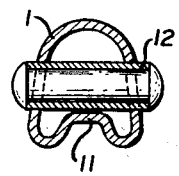
Figures 9, 10:
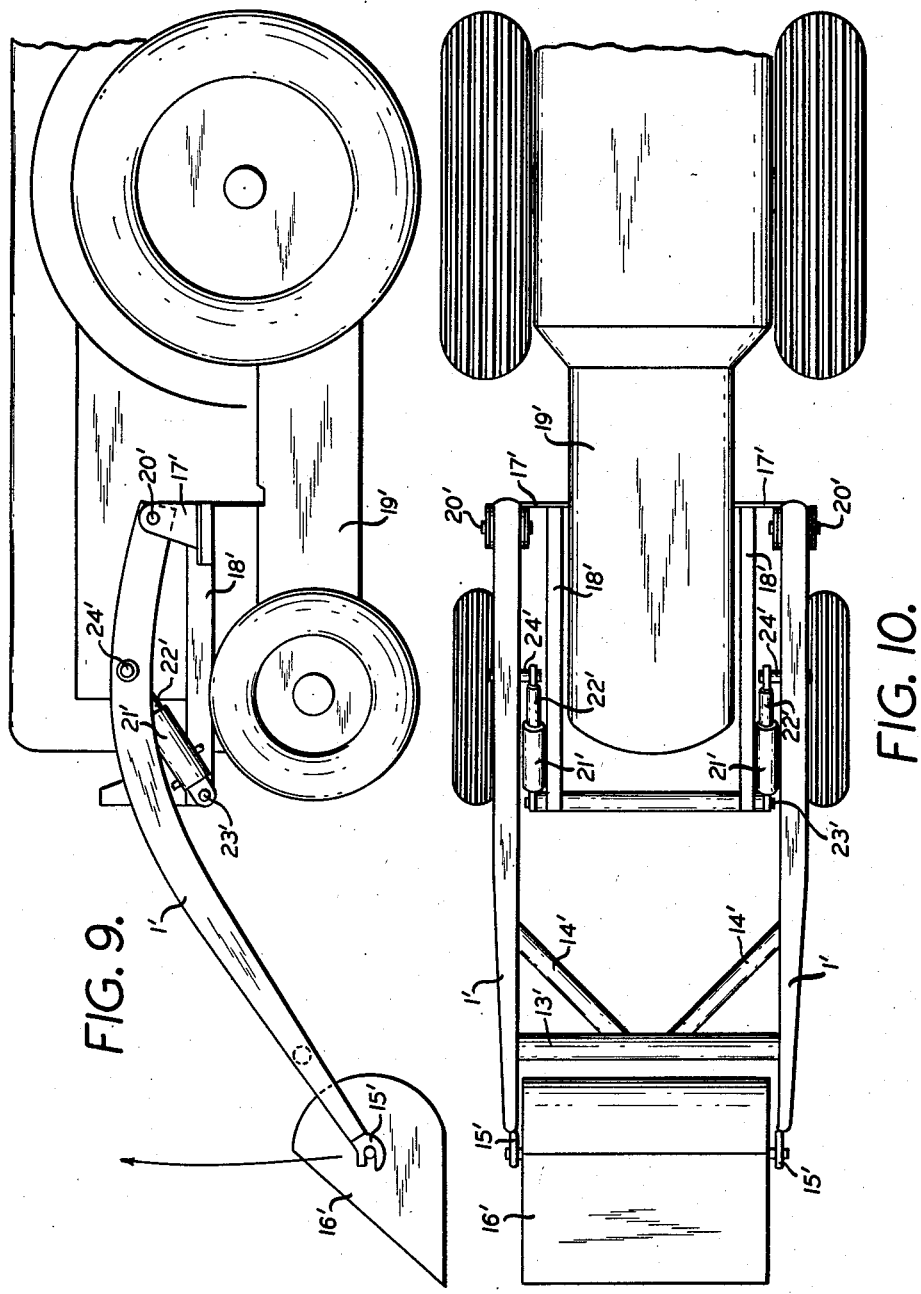

Fig. 3 is a section along the lines 3—3 of Fig. 1;
Fig. 4 is a section along the lines 4—4 of Fig. 1;
Fig. 5 is a section along the lines 5—5 of Fig. 1;
Fig. 6 is a section along the lines 6—6 of Fig. 1;
Fig. 7 is a section along the lines 7—7 of Fig. 1;
Fig. 8 is a section along the lines 8—8 of Fig. 1;
Fig. 9 is a side elevational view of a tractor with a front-end loader made of beams in accordance with the present invention;
Fig. 10 is a plan view of the tractor shown in Fig. 9;
Fig. 11 is a side elevational view of a tractor with a second embodiment of a front-end loader; and
Fig. 12 is a side elevational view of a tractor with a third embodiment of a front-end loader.

Referring now to the drawings, the beam applied to the loader designed in accordance with the present invention is made in accordance with a method disclosed in the copending patent application Serial No. 532,993. The beam 1 is curved in longitudinal direction. It is pivotally joined on a pivot 2 of a supporting column 3. At its free end of narrow cross section the beam 1 is provided with a load hook 4. A bearing bracket 5 is welded to the concave side of the curved beam 1. The outer end of a piston 6 of a hydraulic cylinder 7 is secured to the bracket 5 and the latter is in turn pivotally mounted by means of a pivot 8 in a bracket 9 of the column 3.

Figure 2:
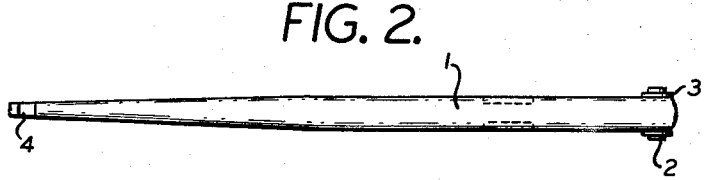
Fig. 2 is a top plan view of the beam shown in Fig. 1.

Referring now to Figs. 2, 3 and 8, the beam 1 is shaped as described above. At the free end of the beam 1 the inside fold 10 permits of attachment and securing thereto a hook 4, while at the rear end of the beam 1 the fold 11 which is of less depth than the fold 10 serves as a support and as a welding base for the bearing bushing 12 of the beam 1.

The zone of highest stress is in the area marked by the section lines 6—6. At this point the beam 1 is flattened only crosswise to the direction of the vertical stresses exerted thereto, so that the greatest moment of resistance is brought about.

The loader designed in accordance with the present invention and shown in Figs. 9 to 12 is disclosed as a front-end loader in connection with a tractor. Two beams $1'$, $1^2$ and $1^3$, respectively, are used in each instance in these structures, the shape of said beams being designed in accordance with the showing in Figs. 1 to 8. Cross bars $13'$ and braces $14'$ (Fig. 10) are welded to each pair of said beams to form a rigid loader frame, the front end of which is equipped with hooks or bearings $15'$, $15^2$ and $15^3$, respectively, in the embodiments shown in Figs. 9, 11 and 12 in order to receive conventional front-end loader equipment devices $16'$, $16^2$ and $16^3$, respectively.

The rear end of the loader frame rests in brackets $17'$, $17^2$ and $17^3$, respectively, which are laterally secured on the chassis $18'$, $18^2$ and $18^3$, respectively, of a tractor $19'$, $19^2$ and $19^3$, respectively. The loader frame is rotatably mounted upon a pivot $20'$, $20^2$ and $20^3$, respectively, and is operated by the hydraulic device $21'$, $22'$, $21^2$, $22^2$, $21^3$ and $22^3$, respectively. The hydraulic cylinders $21'$, $21^2$ and $21^3$, respectively, are pivotally mounted on the pins $23'$, $23^2$ and $23^3$, respectively, of the chassis $18'$, $18^2$ and $18^3$, respectively, while the pistons $22'$, $22^2$ and $22^3$, respectively, reciprocating in the cylinders $21'$, $21^2$ and $21^3$, respectively, are secured at their free ends to the pin $24'$, which in the embodiment shown in Fig. 9 is mounted in the beam $1'$. The chassis $18'$, may form a closed unit with the brackets $17'$, the hydraulic device $21'$ and $22'$ and the beams $1'$, as shown in Figs. 9 and 10, which aggregate is easily exchangeable on the chassis or running gear of the tractor.

The downward bending of the beam 1 which forms the loader brings about the advantage that the loader reaches the ground over the front wheels of the tractor with the least space requirement and with a little space requiring hydraulic device.

Two additional embodiments of a front-end loader mounted on a tractor are disclosed in Figs. 11 and 12. In both these embodiments the hydraulic cylinder $21^2$ and $21^3$, respectively, is of greater length compared with that in the embodiment shown in Fig. 9 and accordingly a longer piston $22^2$ and $23^3$ is likewise provided. Otherwise the structure is substantially identical with that disclosed in Fig. 9.

In the embodiment shown in Fig. 12, however, the beam $1^2$ is equipped with a frame $25^2$ which carries in this structure the pivot $24^2$ for securing the free end of the piston $22^2$ thereto.

While the embodiment shown in Fig. 12 follows substantially the embodiment disclosed in Fig. 9 of the drawings, the beam $1^3$ has fitted thereto a girder $27^3$ which extends upwardly and which is equipped with a plurality of bores $28^3$, the latter being adapted to receive selectively the pivot $24^3$ for securing the free end of the piston $22^3$. By selecting different bores $28^3$ the swinging radius of the loader may be varied and accommodated to the desired working conditions. The beams $1^3$ are likewise downwardly curved in this embodiment and are also of the same design as shown in Figs. 1 to 8.

It is to be understood that the loader may be used for any other purposes than for lifting tractor auxiliary devices and its use is not limited to front-end loaders. The present device is, however, particularly suitable and brings about appreciable advantages in connection with loaders for tractors due to the novel beam design.

While I have disclosed several embodiments of the present invention, it is to be understood that these embodiments are given by example only and not in a limiting sense, the scope of the present invention being determined by the objects and the claims.

I claim:

1. A boom arm for a loading device of a vehicle comprising an integral longitudinal hollow beam having flattened side portions connected by rounded portions, said side portions being disposed in a plane parallel to the plane in which said boom arm swings during lifting and extending substantially along the full length of said boom arm, in order to increase its resistance against bending, and having a folded-in portion projecting inwardly towards the longitudinal axis of said beam at its ends, and said folded-in portion merging with said rounded portions at its ends in order to provide a plurality of substantially parallel sheets formed by said folded-in portion jointly with said flattened side portions for the connection of bearing members and to increase the resistance moment against cracking, turning and shearing at the ends of said beam.

2. The boom arm, as set forth in claim 1, wherein said hollow beam is downwardly curved towards its free end.

3. The boom arm, as set forth in claim 1, which includes at least one cross-bar projecting laterally from said beam and adapted to be secured to another hollow beam.

References Cited in the file of this patent

UNITED STATES PATENTS

| | | |
|---|---|---|
| 1,255,841 | Adams | Feb. 12, 1918 |
| 1,974,458 | Hallquist | Sept. 25, 1934 |
| 1,983,074 | Durell | Dec. 4, 1934 |
| 2,077,454 | Almdale | Apr. 20, 1937 |
| 2,528,588 | Forslund | Nov. 7, 1950 |
| 2,581,731 | Terry | Jan. 8, 1952 |
| 2,610,754 | Inskeep | Sept. 16, 1952 |
| 2,672,994 | Werner | Mar. 23, 1954 |

FOREIGN PATENTS

| | | |
|---|---|---|
| 722,517 | Great Britain | Jan. 26, 1955 |
| 819,065 | Germany | Aug. 4, 1952 |